United States Patent
Boer

(10) Patent No.: US 10,495,304 B2
(45) Date of Patent: Dec. 3, 2019

(54) REFRACTORY SYSTEM FOR LINING THE INTERIOR WALLS OF HIGH-TEMPERATURE FURNACES OR BOILERS AND METHOD OF PROTECTION

(71) Applicant: Imertech SAS, Paris (FR)

(72) Inventor: Marinus Rien Boer, Maassluis (NL)

(73) Assignee: ImerTech SAS, Paris (FR)

( * ) Notice: Subject to any disclaimer, the term of this patent is extended or adjusted under 35 U.S.C. 154(b) by 0 days.

(21) Appl. No.: 15/516,565

(22) PCT Filed: Sep. 30, 2015

(86) PCT No.: PCT/EP2015/072533
§ 371 (c)(1),
(2) Date: Apr. 3, 2017

(87) PCT Pub. No.: WO2016/050830
PCT Pub. Date: Apr. 7, 2016

(65) Prior Publication Data
US 2018/0299123 A1    Oct. 18, 2018

(30) Foreign Application Priority Data
Oct. 3, 2014    (GB) .................................. 1417495.7

(51) Int. Cl.
*F23M 5/02* (2006.01)
*F23M 5/08* (2006.01)
(Continued)

(52) U.S. Cl.
CPC ............. *F23M 5/02* (2013.01); *C04B 35/565* (2013.01); *F23M 5/08* (2013.01); *F27D 1/004* (2013.01);
(Continued)

(58) Field of Classification Search
CPC ........................................................ F23M 5/02
See application file for complete search history.

(56) References Cited

U.S. PATENT DOCUMENTS

| | | | | |
|---|---|---|---|---|
| 1,410,729 A | * | 3/1922 | Balz | ......................... F27D 1/06 110/338 |
| 1,719,642 A | * | 7/1929 | Bailey | ...................... F23M 5/08 122/235.12 |

(Continued)

FOREIGN PATENT DOCUMENTS

| | | |
|---|---|---|
| EP | 2 383 532 A2 | 11/2011 |
| JP | 60-256787 | 12/1985 |

(Continued)

OTHER PUBLICATIONS

EP2383532—machine translation (Year: 2011).*

(Continued)

*Primary Examiner* — Nathaniel Herzfeld
(74) *Attorney, Agent, or Firm* — Finnegan, Henderson, Farabow, Garrett & Dunner, LLP

(57) ABSTRACT

Refractory tile systems for covering an internal wall of a high temperature furnace or boiler are described. The systems may comprise a base tile having a front face and a back face, and a shielding tile having a front face and a back face. The back face of the base tile may comprise one or more attachment points for mounting the base tile to the internal wall using an anchoring system, wherein the shielding tile is equipped with a protrusion along a first side, extending from the back face of the shielding tile and adapted to stably arrange the shielding tile in a suspended position from the base tile when mounted to the internal wall, and an overhang along a second side opposite the first side and extending from the front side of the shielding tile, such that in a mounted position, the overhang partially covers an adjacent shielding tile.

17 Claims, 5 Drawing Sheets

(51) Int. Cl.
*C04B 35/565* (2006.01)
*F27D 1/00* (2006.01)

(52) U.S. Cl.
CPC ...... *F27D 1/0006* (2013.01); *C04B 2235/428* (2013.01); *F23M 2900/05005* (2013.01)

(56) References Cited

U.S. PATENT DOCUMENTS

| | | | | |
|---|---|---|---|---|
| 4,809,621 A | * | 3/1989 | Materna | F22B 37/108 110/323 |
| 5,243,801 A | * | 9/1993 | Aiken | F22B 37/108 122/6 A |
| 5,423,294 A | * | 6/1995 | Cole | F22B 37/108 122/512 |
| 5,673,527 A | * | 10/1997 | Coston | F22B 37/108 110/336 |
| 5,845,610 A | * | 12/1998 | Hatta | F22B 37/108 122/510 |
| 6,145,452 A | | 11/2000 | Heger et al. | |
| 6,360,700 B1 | * | 3/2002 | Kern | F23M 5/04 110/325 |
| 6,412,548 B1 | * | 7/2002 | Terashinna | F22B 37/108 122/512 |
| 6,487,980 B2 | * | 12/2002 | Wilhelmi | F23M 5/04 110/336 |
| 7,204,061 B2 | * | 4/2007 | Terabe | F22B 37/108 122/511 |

FOREIGN PATENT DOCUMENTS

| | | |
|---|---|---|
| JP | 01-101008 | 7/1989 |
| JP | 2006-76814 A | 3/2006 |
| WO | WO 00/57106 | 9/2000 |
| WO | WO 2012/152530 A1 | 11/2012 |

OTHER PUBLICATIONS

International Search Report and Written Opinion dated Dec. 23, 2015, in International PCT Application No. PCT/EP2015/072533, filed Sep. 30, 2015.

* cited by examiner

REFRACTORY SYSTEM FOR LINING THE INTERIOR WALLS OF HIGH-TEMPERATURE FURNACES OR BOILERS AND METHOD OF PROTECTION

CLAIM FOR PRIORITY

This application is a national stage entry under 35 U.S.C. § 371 of PCT International Application No. PCT/EP2015/072533, filed Sep. 30, 2015, and claims the benefit of priority of GB Application No, 1417495.7, filed Oct. 3, 2014, the subject matter of all of which is incorporated herein by reference.

FIELD OF THE INVENTION

The present invention relates to refractory systems for lining interior walls of high-temperature furnaces or boilers, such as for example in waste incinerators.

BACKGROUND OF THE INVENTION

In waste incineration plants, refractory tiles are applied in order to protect the tube sheets from corrosive gases and temperature. These refractory tiles are suspended from stainless steel anchors which are welded onto the tube sheet. The refractory tiles are made of refractory material with a high content of silicon carbide (SiC). Generally the SiC-content is 85% or higher. On the one hand, SiC has a high heat transfer rate, allowing a maximum amount of energy to flow to the tube sheets. Furthermore, due to the high heat transfer, the hot side of the SiC tile remains relatively cool, such that slag remains from the incinerated waste do not stick easily to the tiles.

Because SiC is sensitive to oxidation above 900° C., the tiles may be pre-fired in the absence of oxygen and a nitride bond is created. Such tiles are therefore known as nitride-bonded silicon carbide (nSiC) tiles. However, after some time in use, generally after about 3 to 5 years, nSiC-tiles will also become sensitive to oxidation, and at a certain moment they will start to oxidise. One effect of this is a change in volume of approximately 5% on the hot side, which causes damage to the tile.

EP 2 383 532 A2 discloses refractory systems for lining interior walls of furnaces, comprising a porous refractory main body with a non-porous refractory layer. The main body and the non-porous layer may be separate plates connected together using a SiC-mortar. While this system may provide adequate corrosion protection within and below separate refractory elements, protection is lacking between separate elements, where corrosive gases, slag, oxygen, ash, debris or other objects may penetrate the refractory layer and damage the tube sheets below.

SHORT DESCRIPTION OF THE INVENTION

The present invention is defined in the appended claims.
In particular, the present invention is embodied by a refractory tile system for covering an internal wall of a high temperature furnace or boiler, comprising a base tile having a front face and a back face, and a shielding tile having a front face and a back face, wherein the back face of the base tile comprises one or more attachment points for mounting the base tile to the internal wall using an anchoring system, and wherein the shielding tile is equipped with a protrusion along a first side, extending from the back face of the shielding tile and adapted to stably arrange the shielding tile in a suspended position from the base tile when mounted to the internal wall, and an overhang along a second side opposite the first side and extending from the front side of the shielding tile, such that in a mounted position, the overhang covers a portion of an adjacent shielding tile. According to this embodiment, the refractory system provides improved protection from corrosive gases, slag, oxygen, debris or other objects. The base and/or shielding tiles may be substantially planar and rectangular. The one or more attachment points may be in the form of one or more recesses.

According to one embodiment, in a mounted position the overhang covers the protrusion of a shielding tile mounted directly below. This further improves protection from falling slag, debris, or other objects.

According to one embodiment, the protrusion and the said overhang extend along the entire length of the said first and second sides, respectively, of the said shielding tile. With this arrangement, improved protection is obtained.

According to one embodiment, the base tile and the shielding tile are connected in a mounted position by a cooperating system, wherein protrusions extending from the entire length of a third side and a fourth side opposite the third side of the shielding tile extend into recesses present along the entire length of the corresponding third and fourth sides of the base tile. The cooperating system improves stability of the system in mounted position and renders the installation simpler and more efficient.

According to this embodiment, the recesses along the respective sides in the base tile define a back portion and a front portion of the base tile, and the edges of the front portion and the back portion on the third side are laterally in line with each other, while the edge of the fourth side of the front portion is laterally offset compared to the edge of the fourth side of the back portion in a direction that the front face of the base tile is narrower than the back face of the base tile. With this arrangement, in a mounted position, the system offers improved protection from corrosive, oxidising or reducing gases, as well as solids.

According to one embodiment, the base tile comprises an evacuation channel connecting the recess for mounting the base tile with one of the sides of the base tile, such that air trapped within the said recess may escape to the outside. Accordingly, when the base tile is installed on the interior wall of a furnace or boiler, any air trapped within the recess can escape, particularly in the case where a filler such as mortar or other curable or hardening substance is used for mounting the base tile on the interior wall.

According to one embodiment, the base tile comprises silicon carbide (SiC) and/or nitride-bonded silicon carbide (nSiC). These materials are known for their porous structure and good refractory properties. The base tile may essentially consist of SiC and/or nSiC.

According to one embodiment, the shielding tile comprises non-porous silicon-infiltrated silicon carbide (SiSiC). This material is non-porous and therefore inhibits the transfer of corrosive, oxidising or reducing gases into the shielding tile and damage thereof. The shielding tile may essentially consist of SiSiC.

According to one embodiment, in a mounted position, the third and fourth sides of the base tiles and shielding sides respectively may form a labyrinth to inhibit gas transfer between adjacent mounted tile systems. This arrangement further inhibits any action of corrosive, oxidising or reducing gases on the interior wall of the furnace or boiler.

Also part of the present invention is a method for protecting the interior wall of a furnace or boiler, comprising mounting systems according to the invention in a repetitive pattern on the interior wall of a furnace boiler.

SHORT DESCRIPTION OF THE FIGURES

The invention will be further illustrated by reference to the following figures.

It is understood that the following description and references to the figures concern exemplary embodiments of the present invention and shall not be limiting the scope of the claims.

DETAILED DESCRIPTION OF THE INVENTION

The present invention according to the appended claims provides a refractory system for lining the interior wall of high-temperature furnace or boiler.

The tube sheets running along the interior walls of high-temperature furnaces or boilers such as for example waste incineration plants require protection from heat, corrosive, oxidising or reducing gases, such as for example chlorine, alkaline gases or carbon monoxide, corrosive solids, such as slag, debris, ash, dust, or other objects that may cause damage chemically or mechanically. Due to the high temperatures present, protection is offered by refractory tiles, most commonly on the basis of silicon carbide-based materials.

According to the present invention, a system is provided, wherein a base tile is mounted on the interior wall of the furnace or boiler using at least one recess and a stainless steel anchor welded to the wall, known to the skilled person in the art, and a shielding tile is suspended from the base tile. The base tile may provide the bulk of the mass of the system, in that it is intended to provide refractory protection of the interior wall. The shielding tile is preferably made of a non-porous material and is intended to protect the base tile itself from corrosive gases. Furthermore, according to the present invention, the shielding tile is shaped such that in a mounted position, the overhang on the second side of the shielding tile, which points downwards, covers the protrusion on the first side of the shielding tile mounted directly below, which is orientated at the top side of the shielding tile.

Base Tile

Figure 1:
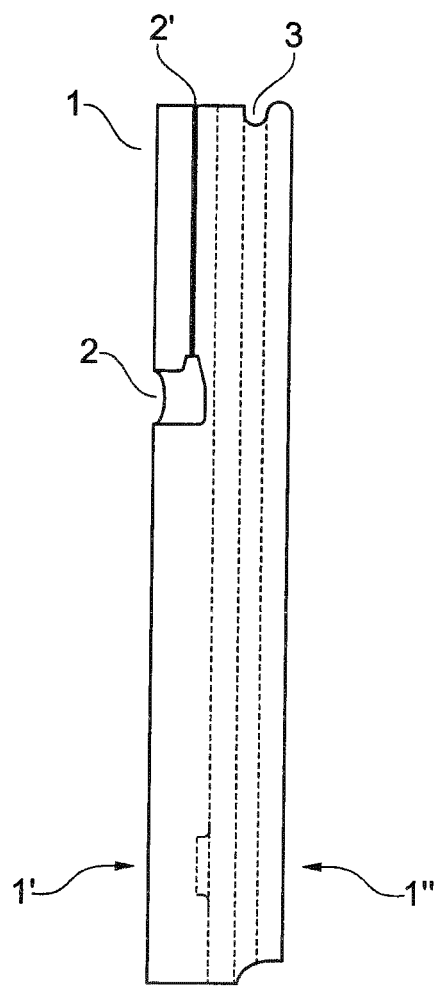
FIG. 1 represents a schematic drawing of a base tile as a part of the system according to the present invention, as seen from the side.

FIG. 1 represents a side view of a base tile 1 as part of the system according to the present invention, wherein the base tile comprises a back face 1' and a front face 1". In a mounted position, the back face 1' is intended to face the interior wall of the furnace or boiler, and the front face 1" is intended to face the inside of the furnace boiler. An attachment point 2 is present in the back face 1' of the base tile 1. The attachment point 2 is used for mounting the base tile 1 to the interior wall of a furnace or boiler, as known to the skilled person. In one embodiment, the base tile 1 may further comprise an evacuation channel 2a, connecting the inside of the attachment point 2 to a face of the base tile 1. The evacuation channel 2a may be constructed such that air can pass through it, can be evacuated out of the attachment point 2. In particular, the base tile 1 may be mounted to the interior wall of a furnace or boiler and secured with the use of a filler such as mortar or any other curable of hardening substance, such as for example SiC-mortar. During the mounting of the base tile on the interior wall of a furnace or boiler, using for example mortar, air may get trapped within the recess 2 and remain there upon hardening of the filler. This may cause problems at elevated temperatures, such as expansion of the air, or general lack of stability of the mounting arrangement of the base tile 1 on the interior wall of the furnace or boiler. The presence of an evacuation channel 2' allows for any surplus air, or other gases, to escape from within the attachment point 2 upon mounting of the base tile 1. In this process, the evacuation channel may partially be filled with a filler. Provided that no gas remains trapped within the attachment point 2, the above mentioned problem is avoided, since any expanding gas upon heating may escape through the evacuation channel 2'.

Figure 5:
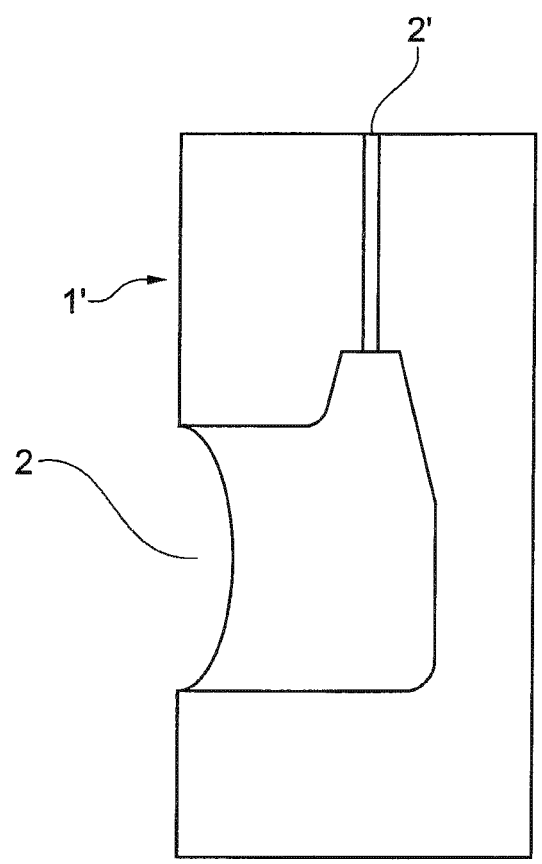
FIG. 5 represents a schematic drawing of an evacuation channel present in the base tile according to one aspect of the present invention.

A more detailed exemplary illustration of the attachment point 2 and evacuation channel 2' is shown in FIG. 5.

On a first side of the base tile 1, shown at the top of the base tile 1, there is a holding recess 3, intended for suspending a shielding tile therefrom. In one embodiment, the holding recess 3 extends along the entire length of the first side of the base tile 1.

Figure 2:
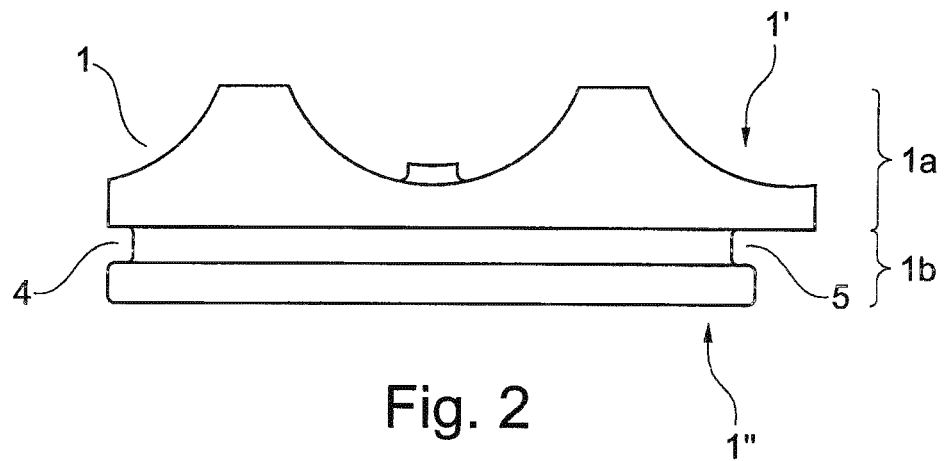
FIG. 2 represents a schematic drawing of a base tile as a part of the system according to the present invention, as seen from the top.

FIG. 2 represents a top view of the base tile 1 shown in FIG. 1. The back face 1' is shown at the top of FIG. 2 and the front face 1" at the bottom of FIG. 2. It can be seen that the shape of the back side of 1' may have a shape that is adjusted to the shape of the tube sheets present on an interior wall of the furnace or boiler. As used herein, the term "essentially planar" includes situations wherein one surface has a shape adjusted to cooperate with another shape, as is the case in this embodiment. The attachment point 2 is not shown as it cannot be seen from this view.

According to the embodiment shown in FIG. 2, sliding recesses 4, 5 on the third and fourth sides of the base tile define a back portion 1a and a front portion 1b of the base tile. According to this embodiment, the edges of the front portion 1b and the back portion 1a on the third side, shown on the left of FIG. 2, are laterally in line with each other, while the edge of the front portion 1b on the fourth side, shown on the right on FIG. 2 is laterally offset compared to the edge of the back portion 1b on the fourth side in a direction such that the front face 1" of the base tile 1 is narrower than the back face 1' of the base tile 1.

The base tile 1 may be made of a refractory material, such as for example silicon carbide (SiC) or nitride-bonded silicon carbide (nSiC), or a mixture thereof. In one embodiment, the base tile consists essentially of SiC and/or nSiC. As used herein the term "consists essentially of" is to be interpreted as comprising at least 80 wt.-% thereof, or at least 85 wt.-%, or at least 90 wt.-%, or at least 95 wt.-%, or at least 98 wt.-%.

Shielding Tile

Figure 3:
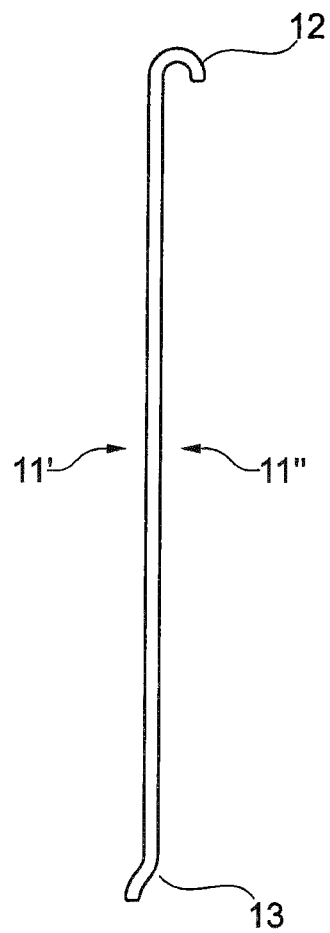
FIG. 3 represents a schematic drawing of a shielding tile as a part of the system according to the present invention, as seen from the side.

FIG. 3 represents a side view of a shielding tile 11 as part of the system according to the present invention, wherein the shielding tile 11 comprises a back face 11' and a front face 11". In a mounted position, the back face 11' is intended to face the interior wall of the furnace or boiler and a front face 1" of a base tile 1, and the front face 11" is intended to face the inside of the furnace or boiler. Accordingly, in a mounted position, the front face 1" of a base tile 1 will face the back face 11' of a shielding tile 11.

The shielding tile 11 comprises a protrusion 12 located on a first side of the shielding tile 11, shown at the top of FIG. 3. The protrusion 12 may extend along the whole length of the first side of the shielding tile 11 and protrudes away from the back face 11' of the shielding tile 11. In a mounted position, the protrusion 12 cooperates with the holding recess 3 of a base tile 1. The shielding tile 11 further comprises an overhang 13 located on a second side of the shielding tile 11, opposite the first side and shown at the bottom of FIG. 3. The overhang 13 may extend along the whole length of the second side of the shielding tile 11 and protrudes away from the front face 11" of the shielding tile 11. In a mounted position, the overhang 13 shall cover the protrusion 12 of a shielding tile 11 mounted directly below.

Figure 4:
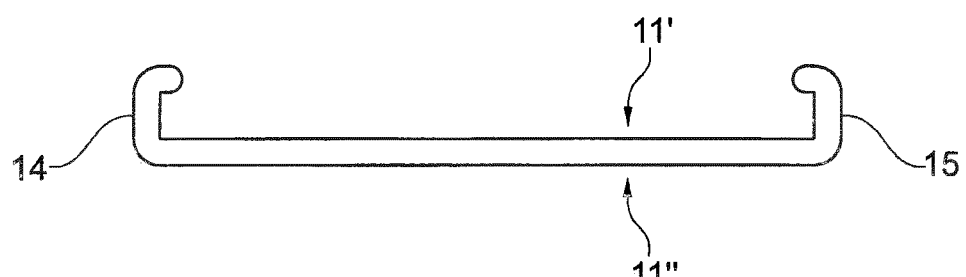
FIG. 4 represents a schematic drawing of a shielding tile as a part of the system according to the present invention, as seen from the top.

FIG. 4 represents a top view of the shielding tile 11 shown in FIG. 3. The back face 11' is shown at the top of FIG. 4 and the front face 11" at the bottom of FIG. 4. According to this embodiment, the shielding tile 11 comprises sliding protrusions 14, 15 on third and fourth sides, shown on the left and right of FIG. 4 respectively. In a mounted position, sliding protrusions 14, 15 are intended to cooperate with sliding recesses 4, 5 of a base tile 1 mounted to the interior wall of a furnace or boiler.

The shielding tile 11 may be made of a non-porous refractory material, such as for example silicon-infiltrated silicon carbide (SiSiC). In one embodiment, the base tile consists essentially of SiSiC.

Mounted Tile System

Figure 6:
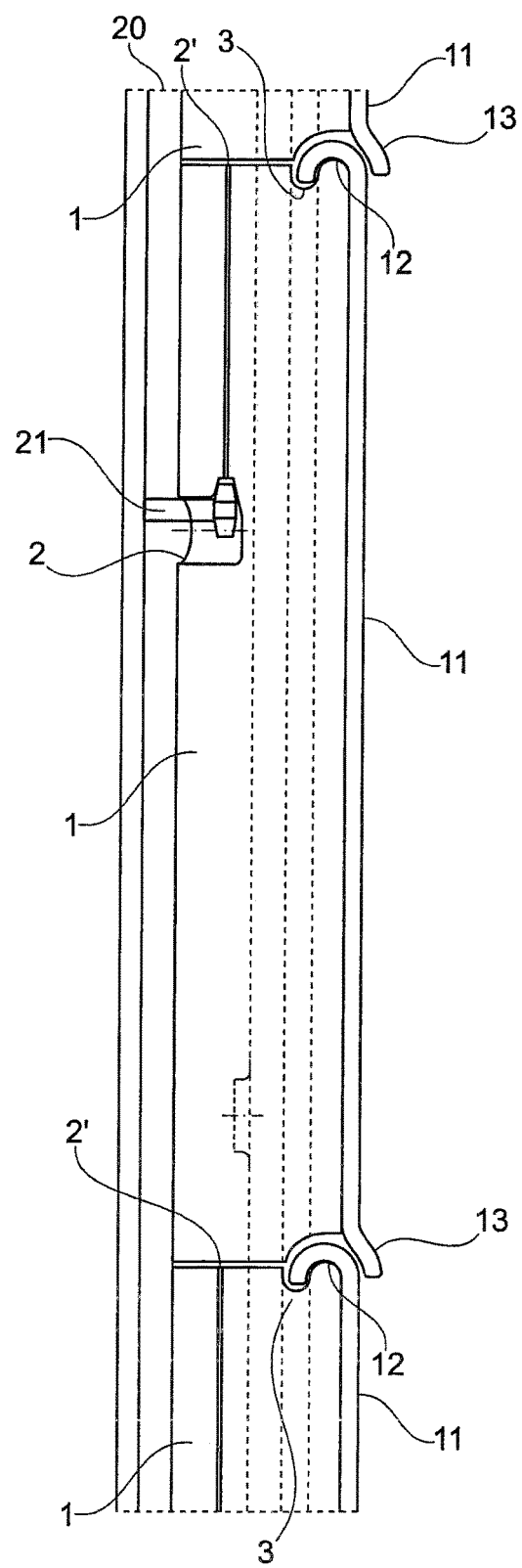
FIG. 6 represents a schematic drawing of a system according to the present invention, with base and shielding tiles in a mounted position, as seen from the side.

FIG. 6 represents a side view of a tile system according to the present invention when mounted to an interior furnace or boiler wall 20. As illustrated, base tiles 1 are mounted to the furnace or boiler wall 20 through recess 2 and anchor 21. The recesses are ideally filled with a filler such as a cured or hardened substance, such as for example a silicon carbide mortar, for securing the base tile 1 on the interior wall 20 of the furnace or boiler. Furthermore, there may also be a layer of mortar or other filler present between the interior wall 20 of the furnace or boiler and the base tile 1. It can be seen that on mounting the base tiles 1 to the interior wall 20 of the furnace or boiler using a filler substance, any air trapped within the attachment point 2 may escape through the evacuation channel 2'.

Suspended from the base tiles 1 are shielding tiles 11, wherein protrusions 12 of the shielding tiles 11 are engaged in respective holding recesses 3 of base tiles 1. It can be clearly seen that in this arrangement, the overhangs 13 cover the protrusions 12 of the shielding tiles 11 located directly below. This arrangement protects the interfaces between to vertically adjacent shielding tiles 11 from entering of solid particles such as slag, ash, waste material, falling debris or other materials. Accordingly, the present invention provides improved protection of the internal furnace or boiler wall 20.

Figure 7:
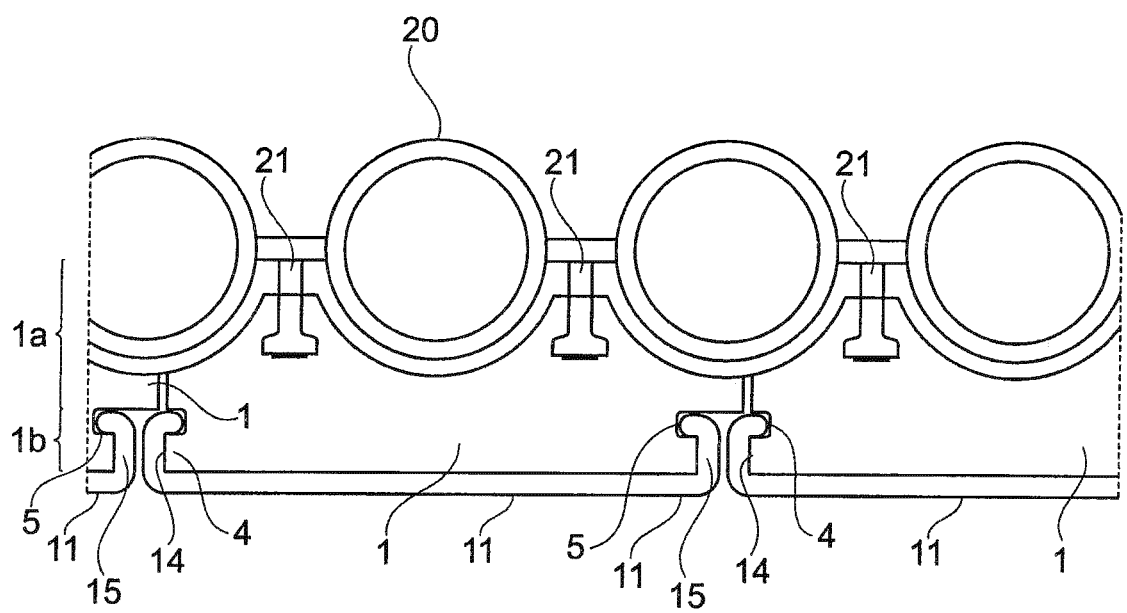
FIG. 7 represents a schematic drawing of a system according to the present invention, with base and shielding tiles in a mounted position, as seen from the top.

FIG. 7 represents a top view of a tile system according to the present invention when mounted to an interior furnace or boiler wall 20. As illustrated, base tiles 1 are mounted to the furnace or boiler wall 20 using anchors 21. Shielding tiles 11 are suspended from base tiles 1 through holding recesses and protrusions (not shown). Furthermore, they are kept in place laterally by the cooperating system consisting of sliding recesses 4, 5 and corresponding sliding protrusions 14, 15 on third and fourth sides of the base tiles 1 and shielding tiles 11 respectively. As can be seen in this embodiment, the shape of the base tiles 1, wherein the third sides on the front and back portions 1b, 1a of the base tiles 1 are aligned, and the fourth sides of the front and back portions 1b, 1a of the base tiles 1 are offset, creates a labyrinth in the mounted position, through which gases, such as corrosive, oxidising or reducing gases, may not easily enter and damage either the base tiles 1 or the internal wall 20 of the furnace or boiler. With the same arrangement, also the entering of solid waste, ash, slag or other debris is inhibited. Accordingly, the refractory tile system according to the present invention provides improved protection for the furnace or boiler interior wall 20.

Also part of the present invention is a method for protecting the interior wall of a high-temperature furnace or boiler, such as for example a waste incinerator from chemical damage by corrosive, oxidising or reducing gases and from mechanical or chemical damage by solids, such as slag, ash, debris, or the like, comprising mounting a refractory tile system of the present invention at the interior wall of the furnace or boiler. The system according to the present invention provides improved protection due to the structural shape and relative arrangement of the base and shielding tiles in a mounted refractory lining of the furnace or boiler interior wall.

It should be noted that the present invention may comprise any combination of the features and/or limitations referred to herein, except for combinations of such features which are mutually exclusive. The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

REFERENCE NUMERALS 1 base tile
1' back face of the base tile
1" front face of the base tile
2 attachment point
2' evacuation channel
3 holding recess
4 sliding recess
5 sliding recess
11 shielding tile
11' back face of the shielding tile
11" front face of the shielding tile
12 protrusion
13 overhang
14 sliding protrusion
15 sliding protrusion
20 furnace or boiler wall
21 metallic anchor

The invention claimed is:
1. A refractory tile system for covering an internal wall of a high temperature furnace or boiler, comprising:
a base tile having a front face and a back face, and
a shielding tile having a front face and a back face, wherein the back face of the base tile comprises one or more attachment points for mounting the base tile to the internal wall using an anchoring system, wherein the shielding tile is equipped with a protrusion along a first side, extending from the back face of the shielding tile and adapted to stably arrange the shielding tile in a suspended position from the base tile when mounted to the internal wall, and an overhang along a second side opposite the first side and extending from the front face of the shielding tile, such that in a mounted position, the overhang covers a portion of an adjacent shielding tile, and wherein the base tile and the shielding tile are connected in a mounted position by a cooperating system, wherein sliding protrusions extending from the entire length of a third side and a fourth side opposite the third side of the shielding tile extend into sliding recesses present along the entire length of the corresponding third and fourth sides of the base tile.

2. The refractory tile system according to claim 1, wherein the base tile and the shielding tile are substantially planar and substantially rectangular.

3. The refractory tile system according to claim 1, wherein the one or more attachment points are one or more recesses.

4. The refractory tile system according to claim 1, wherein the overhang covers the protrusion of a shielding tile mounted directly below.

5. The refractory tile system according to claim 4, wherein the protrusion and the overhang extend along the entire length of the first and second sides, respectively, of the shielding tile.

6. The refractory tile system according to claim 1, wherein the sliding recesses along the third and fourth sides in the base tile define a back portion and a front portion of the base tile, and wherein the edges of the front portion and the back portion on the third side are laterally in line and the edge of the fourth side of the front portion is laterally offset compared to the edge of the fourth side of the back portion in a direction such that the front face of the base tile is narrower than the back face of the base tile.

7. The refractory tile system according to claim 3, wherein the base tile comprises an evacuation channel connecting the recess for mounting the base tile with one of the sides of the base tile, such that air trapped within the recess may escape to the outside.

8. The refractory tile system according to claim 1, wherein the base tile comprises silicon carbide (SiC) or nitride-bonded silicon carbide (nSiC).

9. The refractory tile system according to claim 1, wherein the shielding tile comprises non-porous silicon-infiltrated silicon carbide (SiSiC).

10. The refractory tile system according to claim 8, wherein the base tile consists essentially of silicon carbide (SiC) or nitride-bonded silicon carbide (nSiC), or wherein the shielding tile consists essentially of non-porous silicon-infiltrated silicon carbide (SiSiC).

11. The refractory tile system according to claim 1, wherein, in a repetitive mounted position, the third and fourth sides of the base tile and shielding tile respectively form a labyrinth to inhibit gas transfer between adjacent mounted tile systems.

12. A method for protecting an interior wall of a furnace or boiler from corrosive gases, oxygen, slag, debris, or other objects, comprising mounting a refractory tile system according to claim 1 in a repetitive pattern on the interior wall of the furnace or boiler.

13. The refractory tile system according to claim 9, wherein the base tile consists essentially of silicon carbide (SiC) or nitride-bonded silicon carbide (nSiC), or wherein the shielding tile consists essentially of non-porous silicon-infiltrated silicon carbide (SiSiC).

14. The refractory tile system according to claim 1, wherein the portion of the adjacent shielding tile covered by the overhang is on a front face of the adjacent shielding tile.

15. A refractory tile system comprising:
a base tile having a front face and a back face, wherein the back face of the base tile comprises at least one recess for mounting the base tile to a wall using an anchoring system, the back face of the base tile further comprising an evacuation channel in communication with the at least one recess; and
a shielding tile having a front face, a back face, a first side, and a second side opposite the first side;
wherein the first side of the shielding tile includes a protrusion extending from the back face of the shielding tile, the protrusion being configured to couple to the base tile, such that the shielding tile is suspended from the base tile when the base tile is mounted to the wall; and
wherein the second side of the shielding tile includes an overhang extending from the front face of the shielding tile, such that in a mounted position, the overhang covers a portion of an adjacent shielding tile, and wherein the base tile and the shielding tile are connected in a mounted position by a cooperating system, wherein sliding protrusions extending from the entire length of a third side and a fourth side opposite the third side of the shielding tile extend into sliding recesses present along the entire length of the corresponding third and fourth sides of the base tile.

16. The refractory tile system according to claim 15, wherein the base tile comprises at least one of silicon carbide (SiC) or nitride-bonded silicon carbide (nSiC), and wherein the shielding tile comprises non-porous silicon-infiltrated silicon carbide (SiSiC).

17. The refractory tile system according to claim 16, wherein the portion of the adjacent shielding tile covered by the overhang is on a front face of the adjacent shielding tile.

* * * * *